(12) United States Patent
Schentrup et al.

(10) Patent No.: US 7,379,473 B2
(45) Date of Patent: May 27, 2008

(54) METHOD AND SYSTEM FOR PROVIDING INTEGRATED DATA SERVICES TO INCREASE SPECTRUM EFFICIENCY

(75) Inventors: Philip Schentrup, Hollywood, FL (US); Dave Heeschen, Coral Springs, FL (US); Anil Patel, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 834 days.

(21) Appl. No.: 10/453,387

(22) Filed: Jun. 3, 2003

(65) Prior Publication Data

US 2004/0246938 A1    Dec. 9, 2004

(51) Int. Cl.
*H04L 12/43* (2006.01)
*H04J 3/12* (2006.01)

(52) U.S. Cl. ..................... 370/458; 370/528
(58) Field of Classification Search ................ 704/205; 370/528, 458; 455/95
See application file for complete search history.

(56) References Cited

U.S. PATENT DOCUMENTS

| | | | |
|---|---|---|---|
| 5,533,004 A | | 7/1996 | Jasper et al. |
| 5,594,738 A | | 1/1997 | Crisler et al. |
| 5,960,389 A | * | 9/1999 | Jarvinen et al. ............ 704/220 |
| 6,131,049 A | | 10/2000 | Marsan et al. |
| 6,269,331 B1 | * | 7/2001 | Alanara et al. ............ 704/205 |
| 6,577,862 B1 | * | 6/2003 | Davidson et al. ........... 370/433 |
| 2004/0062274 A1 | * | 4/2004 | Hakansson et al. ......... 370/468 |

* cited by examiner

*Primary Examiner*—Seema S. Rao
*Assistant Examiner*—Mon Cheri S Davenport

(57) ABSTRACT

A method and system of sending supplemental information during a telecommunications session includes the step (305) of detecting a period of silence within the telecommunications session. The period of silence can be detected from at least one member of the telecommunications session. Comfort noise can be specified within at least one time slot (205) of a plurality of consecutive time slots (205, 210) for a channel over which the period of silence is detected. For at least one other time slot of the channel (210), non-voice data is specified such that the channel includes both comfort noise and other non-voice data during the period of silence. The consecutive time slots (205, 210) can be associated with a data block (200). The non-voice data can be a data payload of the other time slot (210).

21 Claims, 3 Drawing Sheets

METHOD AND SYSTEM FOR PROVIDING INTEGRATED DATA SERVICES TO INCREASE SPECTRUM EFFICIENCY

CROSS-REFERENCE TO RELATED APPLICATIONS

Not applicable

FIELD OF THE INVENTION

This invention relates to radio communications, and more particularly to radio communications protocols.

BACKGROUND OF THE INVENTION

Integrated Dispatch Enhanced Network (iDEN) is a wireless technology combining the capabilities of a digital cellular telephone, two-way radio, alphanumeric pager, and data/fax modem in a single network. iDEN operates in the 800 MHz, 900 MHz and 1.5 GHZ frequency bands and is based on time division multiple access (TDMA) and global system for mobile communications (GSM) architecture. The iDEN protocol provides 25 kHz channels which are divided into six time slots.

In the iDEN protocol, there is a continuous stream of data in the outbound direction which is received and processed by a mobile station (MS). Often the data contains no significant information, for example, when a person using a first MS at one end of an iDEN communication link pauses during a conversation. During the pauses, comfort noise parameters are generated by the first MS and passed to a second MS in a time slot referred to as a comfort noise slot. The comfort noise parameters typically contain audio coefficients of the background noise of the environment where the second MS is located.

The comfort noise slot is typically followed by up to seven fill slots. The comfort noise slot and seven fill slots constitute a data block. To preserve battery life, the first MS typically does not transmit data during the fill slots. Hence, an uplink data block being uploaded by the first MS typically contains empty fill slots. To generate comfort noise at times correlating to the fill slots, comfort noise generated from the comfort noise parameters is repeated. The comfort noise parameters are re-generated and transmitted for every uplink data block until the person begins speaking again. Significantly, the fill slots in each data block represent wasted bandwidth since they are not being used to carry a data payload.

SUMMARY OF THE INVENTION

The present invention relates to a method of sending supplemental information during a telecommunications session. The method includes the step of detecting a period of silence within the telecommunications session. The period of silence can be detected from at least one member of the telecommunications session. The method also includes the step of specifying comfort noise within at least one of a plurality of consecutive time slots for a channel over which the period of silence is detected. For at least one other time slot of the channel, non-voice data is specified such that the channel includes both comfort noise and other non-voice data during the period of silence. The consecutive time slots can be associated with a data block. The non-voice data can be a data payload of the other time slot, which can be a time slot allocated for non-voice data. The non-voice data can be provided in a circuit data format.

The non-voice data can be specified by a fixed network device, which also can transmit the non-voice data to a communications device. In another arrangement, a communications device, such as a mobile communications device, can specify the non-voice data and transmit the non-voice data to a communications network. The communications device also can transmit the non-voice data to a second communications device.

The method also can include the step of signaling that the non-voice data is provided as the data payload. The signaling step can include the step of modifying a header associated with the other time slot. The signaling step can further include the step of inserting an identifier into a channel identification field associated with the header. The identifier can include a single bit of data. In one arrangement, the header can be a slot descriptor block.

DETAILED DESCRIPTION OF THE DRAWINGS

The present invention relates to a system and a method for providing integrated data services. The system for providing integrated data services can utilize communications bandwidth which would otherwise be unused when there is silence on at least one end of a telecommunications session. The otherwise unused communications bandwidth can be utilized for transmitting data to and from a communications device, thereby enabling the data to be transmitted without requiring additional bandwidth allocation and without interrupting voice communications.

Figure 1:
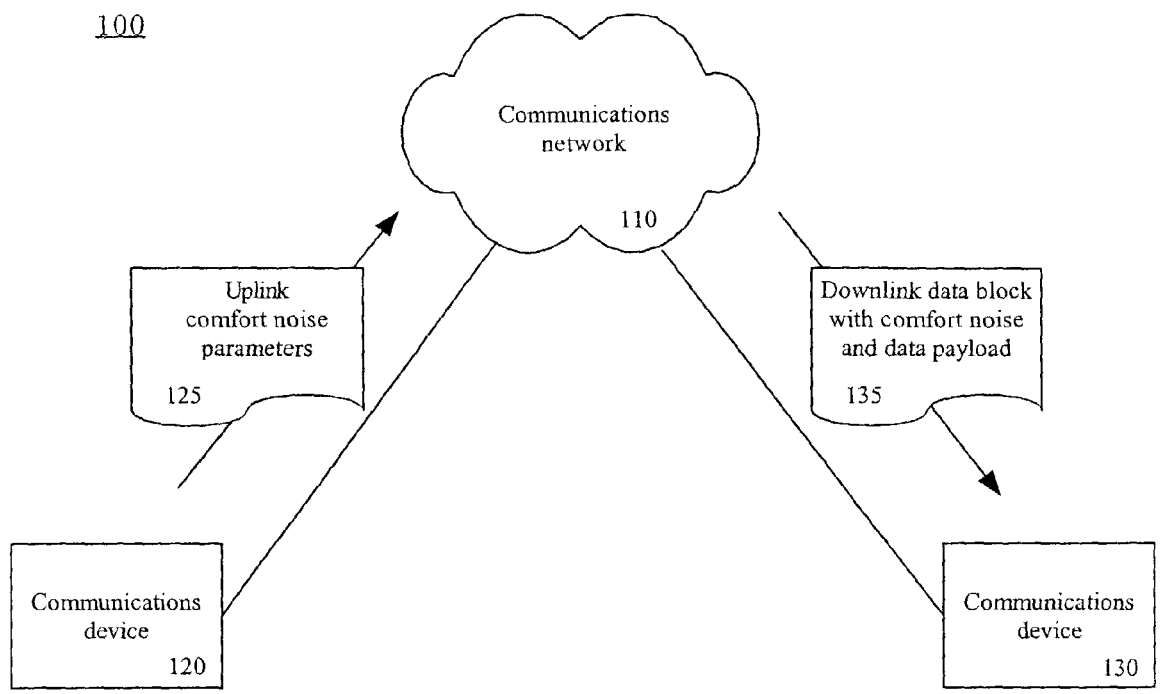
FIG. 1 is an exemplary schematic diagram of a communication system incorporating integrated data services in accordance with the inventive arrangements disclosed herein.

Referring to FIG. 1, an exemplary schematic diagram of a communications system 100 incorporating integrated data services is shown. The communications system 100 can include a communications network 110. The communications network 110 can be any communications network which can be used to transmit voice signals and other data. For instance, the communications network 110 can be an Integrated Dispatch Enhanced Network (iDEN), a cellular communication network, a public switched telephone network (PSTN), a public switched packet network (PSPN), the Internet, or any other communications network, or combination of communications networks.

Communications devices 120, 130 can be operatively connected to the communications network 110. For instance, the communications devices 120, 130 can be connected to the communications network 110 wirelessly or via a wired connection. Alternatively, a direct communication link, such as a wireless link, can be established between the communications devices 120, 130.

The communications devices 120, 130 can be any communications devices which transmit and/or receive voice signals and other types of data. For example, the communications devices 120, 130 can be mobile stations, such as mobile telephones, combined personal digital assistants (PDA's), mobile radios or smartphones. The communications devices 120, 130 also can be telephones having data transmit/receive capability, video phones, or any other suitable voice/data communications devices. In one arrangement, the communications devices 120, 130 can each include a processor which can be programmed to execute certain operational tasks performed by the communications devices.

In operation, a telecommunications session can be established between the communications device 120 and another communications device, for instance communications device 130. As defined herein, a telecommunications session is a communications session which includes the communication of voice signals. In protocols such as the iDEN protocol, there can be a continuous stream of data sent over a communications channel in the outbound direction to the communication device 130. However, the data often contains no significant information, for example, when a first person using communications device 120 pauses speaking during a conversation and empty fill slots are passed. These empty fill slots represent an inefficient use of valuable bandwidth. The present invention enables a downlink data block 135 generated by a fixed network device within the communications network 110 to carry a data payload over the communications channel, thereby improving spectrum efficiency.

The data payload can include messages, images, packet data information, status information of the communications network 110, software or firmware upgrades for the communications device 130, or any other transmittable data. The data payload can be inserted into the data block 135 by a fixed network device within the communications network 110, or another device which can process the data block 135 and to which the communications device 130 is operatively connected. If the amount of data is too large to fit into a single data block, the data can be inserted among multiple data blocks. The data then can be forwarded by the communications network to the communications device 130, or another communications device. At this point it should be noted that the data payload can be sent using a circuit data format, which is known to those skilled in the art. Circuit data commonly includes forward error correction, which can be beneficial for ensuring proper protection of the data payload.

In an alternate arrangement, an uplink data block 125 generated by the communications device 120 can carry a data payload over the communications channel. The data payload can include messages or images, for instance those generated by the communications device 120, status information of communications device 120, packet data information, or any other transmittable data. The data payload can be can be inserted into the data block 125 by the communications device 120, or another device which can process the data block 125 and to which the communications device 120 is operatively connected. Again, if the amount of data is too large to fit into a single data block, the data can be inserted among multiple data blocks. The data then can be forwarded by the communications network to an appropriate location. For instance, messages, images or packet data information can be forwarded to the communications device 130, or another communications device.

The data also can be extracted from the data block 125 and forwarded elsewhere. For example, a data payload can include a destination address, for example an e-mail address, a device having an Internet address, or to any other suitable device which can receive the data payload. Further, information such as device status information can be forwarded to fixed network equipment, such as a mobile communication base station, and the like. A base station controller within the communications network 110 can incorporate suitable software algorithms to extract the data from the data block 125 and forward the data payload as required.

Figure 2:
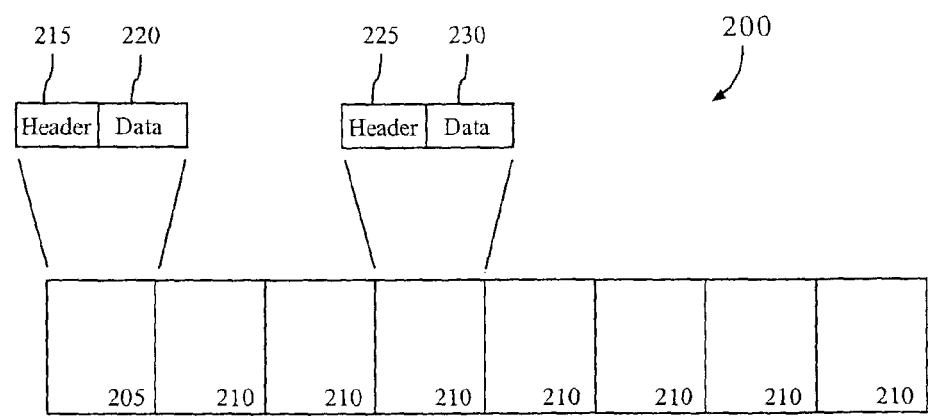
FIG. 2 is an exemplary diagram representing a data block having data allocation in accordance with the inventive arrangements disclosed herein.

An exemplary data block 200 is shown in FIG. 2. The data block 200 can include a plurality of time slots 205, 210 for the communication channel. As shown, each of the time slots 205, 210 preferably comprise a data field 220, 230. The data fields 220, 230 can be used to transmit information data packets. The time slots 205, 210 also can include a header 215, 225. As defined herein, a header is data information which can be embedded within a data block and describes something about data contained within one or more data fields. A header can precede a data field, follow a data field, be embedded within a data field, or associated with data by any other suitable method. A header 215, 225 can, for example, identify a type of data and the size of the data contained in an a data field 220, 230. Additionally, the header 215, 225 can be used for channel identification and can contain status information related to the time slot 205, 210 with which the header is associated. For example, in the iDEN protocol each header 215, 225, which also can be referred to as a slot descriptor block (SDB), can describe a channel type, a user to whom the channel is assigned, and a time advance for a communications device to use in transmit timing. Importantly, this information is not needed for every time slot.

When the data block 200 is not carrying voice data, the data field 220 associated with the time slot 205 can be utilized to carry comfort noise parameters. Further, each data field 230 associated with the time slots 210 can be utilized to carry the data payload. The header 215 can be modified to identify the time slot 205 as the comfort noise slot. Moreover, the headers 225 can signal that the data payload of the current time slot 210 is not voice or comfort noise parameters, but rather some other type of data. This signaling can be accomplished using any of a myriad of techniques. For example, the time slots 210 can be defined within a communications protocol as specialized time slots that carry a certain data type. In another arrangement, the header 225 can comprise a field for channel identification which can identify a specific communication channel as a control channel. Such channel identification could be as simple as a single bit identifier. The identification could be used in conjunction with a channel type identifier to specify that the time slot 210 with which the header 225 is associated is a specialized time slot.

Figure 3:
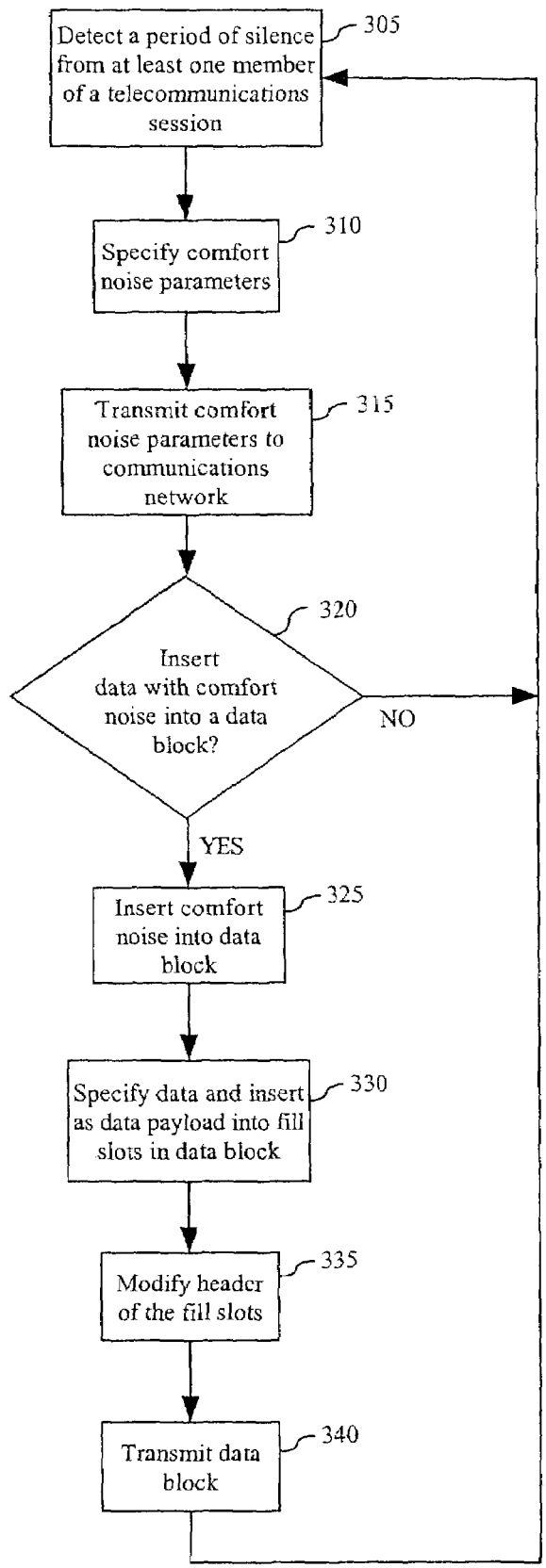
FIG. 3 is a flow chart illustrating a method of integrating a data payload into a data block which includes comfort noise in accordance with the inventive arrangements disclosed herein.

Referring to FIG. 3, a flow chart illustrating a method of integrating a data payload into a data block which includes comfort noise is shown. Beginning with step 305, a period of silence from at least one member of a telecommunications session can be detected. For example, a first communications device can detect that no speech input, or audio input above a specified threshold, is being received by an input transducer associated with the communications device. Continuing at step 310, comfort noise parameters can be specified by the communications device. The comfort noise parameters then can be transmitted to a communications network using any suitable transmission protocol. For example, the comfort noise parameters can be transmitted using the associated channel protocol (ACP), which is known to the skilled artisan. Notably, the comfort noise parameters can be regenerated and transmitted at periodic intervals until a user of the communications device begins speaking again.

In an alternative arrangement, the comfort noise parameters can be generated by a fixed network device, such as a base station, a repeater, or any other communication network component that can process communications signals. For example, the fixed network device can monitor a communications signal being received from the communications device. Software algorithms can be used by the fixed network device to distinguish background noise from voice data contained in a communications signal, and the comfort noise parameters can be generated from the background noise.

Referring to decision block 320, if a fixed network device receives comfort noise parameters, the fixed network device can generate a data block having the comfort noise parameters in a time slot within the data block, as shown in step 325. As noted, the time slot having the comfort noise parameters can be followed by empty time slots, or fill slots. Proceeding to step 330, a data payload can be inserted into the fill slots. In the case that the data payload will not fit into a single data block, the data payload can be divided between multiple data blocks.

Continuing at step 335, the fill slots can be modified to indicate that they contain data which is neither voice data nor comfort noise parameters. For instance, headers associated with the fill slots can be modified to provide such indication. Alternatively, the header of a single time slot within the data block can be modified to identify the type of data contained within the fill slots of the data block. For example, the header of the a time slot having the comfort noise parameters can identify the fill slots. Still, the invention is not so limited and any method of indicating the type of data contained within the fill slots can be used.

The data block then can be transmitted over a communications channel, as shown in step 340. For example, the data block can be transmitted to a second communications device. The second communications device can process the header information contained within the data block to determine what type of data is contained within the time slots of the data block and process the data accordingly.

Figure 4:
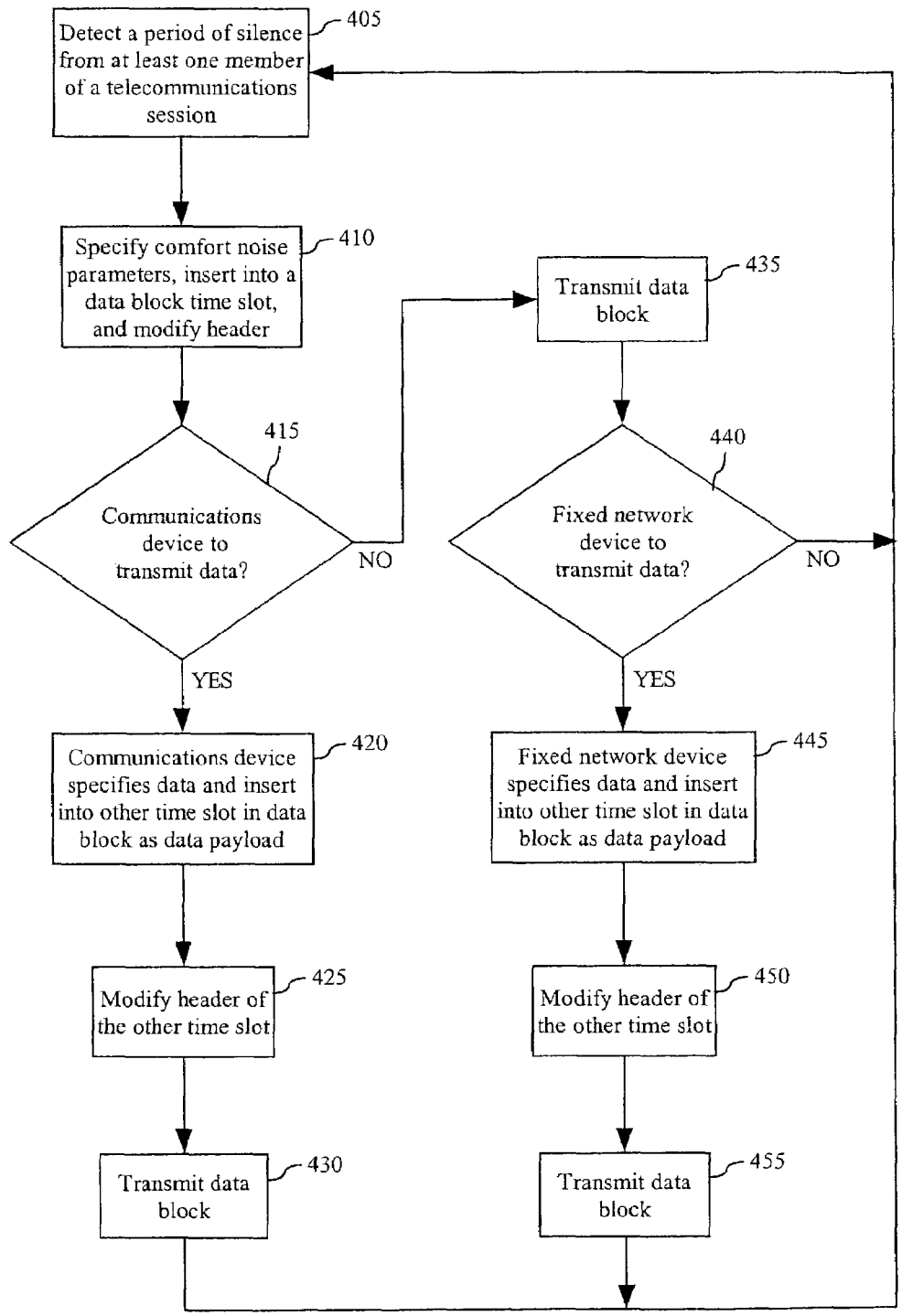
FIG. 4 is a flow chart illustrating an alternative method of integrating a data payload into a data block which includes comfort noise in accordance with the inventive arrangements disclosed herein.

Referring to FIG. 4, a flow chart illustrating an alternate method of integrating a data payload into a data block which includes comfort noise is shown. Beginning with step 405, a period of silence from at least one member of a telecommunications session can be detected. Continuing at step 410, comfort noise parameters can be specified and inserted into a time slot of a data block being generated. The header of the time slot also can be modified to identify that the time slot contains comfort noise parameters.

If the communications device desires to transmit non-voice data, the communications device can specify the data and insert the data as a data payload into at least one time slot of the data block, as shown in decision box 415 and step 420. Proceeding to step 425, the time slots having the data payload can be modified to indicate that the time slots contain data which is neither voice data nor comfort noise parameters. Further, any channel identifiers being used can be inserted into the header. For example, channel identifiers can be inserted into the header to indicate the type of channel which will be used to transmit the data block and to indicate whether the channel is a control channel.

The data block then can be transmitted over a communications channel as shown in step 430. For instance the communications device can transmit the data block to the communications network. Alternatively, the communications device can transmit the data block to another communications device if there is a direct communications link between the two communications devices. Referring back to step 405, the communications device can then continue monitoring the telecommunication session to detect a period of silence.

Referring again to decision box 415 and step 435, if the communications device does not have data to transmit, the data block can be transmitted to the communications network or directly to another communications device. Referring to decision block 440, if a fixed network device, for example a base station, receives a data block containing comfort noise parameters, but the data block does not contain a data payload, the fixed network device can insert a data payload into time slots in the data block, as shown in step 445. Again, in the preferred arrangements the time slots used for the data payload are time slots not having the comfort noise parameters. Proceeding to step 450, the time slots having the data payload can be modified to indicate that the time slots contain data which is neither voice data nor comfort noise parameters. Further, any channel identifiers being used can be inserted into the header. The data block then can be transmitted over a communications channel as shown in step 455. For instance, the data block can be transmitted to other fixed network devices or other communications devices.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

What is claimed is:

1. A method of sending supplemental information during a telecommunications session comprising the steps of:
   detecting a period of silence within the telecommunications session;
   specifying comfort noise within at least one of a plurality of consecutive time slots for a channel over which said period of silence is detected, wherein the channel includes both unlink and downlink connections; and
   for at least one other time slot of said channel, specifying non-voice data such that said channel includes both comfort noise and other non-voice data during said period of silence on both the uplink and downlink connections.

2. The method according to claim 1, wherein said plurality of consecutive time slots are associated with a data block.

3. The method according to claim 1, wherein said non-voice data is specified by a fixed network device.

4. The method according to claim 3, wherein said fixed network device transmits said non-voice data to a communications device.

5. The method according to claim 1, wherein said non-voice data is specified by a communications device.

6. The method according to claim 5, wherein said communications device is a mobile communications device.

7. The method according to claim 5, wherein said communications device transmits said non-voice data to a communications network or another communications device.

8. The method according to claim 1, further comprising the step of providing said non-voice data as a data payload of said at least one other time slot.

9. The method according to claim 8, further comprising the step of signaling that said non-voice data is provided as said data payload.

10. The method according to claim 9, wherein said signaling step comprises the step of modifying a header associated with said at least one other time slot.

11. The method according to claim 10, wherein said signaling step further comprises the step of inserting an identifier into a channel identification field associated within said header.

12. The method according to claim 11, wherein said identifier comprises a single bit of data.

13. The method according to claim 10, wherein said header is a slot descriptor block.

14. The method according to claim 1, wherein said non-voice data is provided in a circuit data format.

15. The method according to claim 1, wherein said at least one other time slot is a time slot allocated for said non-voice data.

16. The method according to claim 1, wherein said period of silence is detected from at least one member of said telecommunications session.

17. A system of sending supplemental information during a telecommunications session comprising:
   a first communication device having a processor programmed to:
      detect a period of silence within the telecommunications session; and
      specify comfort noise within at least one of a plurality of consecutive time slots for a channel over which said period of silence is detected, wherein the first communication device specifies the comfort noise for an uplink connection of the channel; and
   a second communication device having a processor programmed to:
      for at least one other time slot of said channel, specify non-voice data such that said channel includes both comfort noise and other non-voice data during said period of silence, wherein the second communication device specifies the non-voice data for a downlink connection of the channel.

18. The system of claim 17, wherein the first communication device is selected from a group comprising a mobile cellular phone, a smartphone, and a combined personal digital assistant and a mobile phone.

19. A system of sending supplemental information during a telecommunications session comprising:
   a communication device having a processor programmed to:
      detect a period of silence within the telecommunications session;
      specify comfort noise within at least one of a plurality of consecutive time slots for a channel over which said period of silence is detected, wherein the channel includes both unlink and downlink connections; and
      for at least one other time slot of said channel, specify non-voice data such that said channel includes both comfort noise and other non-voice data during said period of silence on both the unlink and downlink connections.

20. The system of claim 19, wherein the communication device is selected from a group comprising a mobile cellular phone, a smartphone, and a combined personal digital assistant and a mobile phone.

21. The system of claim 19, wherein the system further comprises a second communication device that specifies additional non-voice data during said period of silence.

* * * * *